United States Patent
Erno et al.

(10) Patent No.: US 12,000,662 B2
(45) Date of Patent: Jun. 4, 2024

(54) PRESSURE EQUILIBRATED THERMAL INSULATION GAP

(71) Applicant: General Electric Company, Schenectady, NY (US)

(72) Inventors: Daniel Jason Erno, Clifton Park, NY (US); William Dwight Gerstler, Niskayuna, NY (US); Biao Fang, Clifton Park, NY (US); Laura Cerully Dial, Clifton Park, NY (US); Voramon Supatarawanich Dheeradhada, Latham, NY (US); Hendrik Pieter Jacobus de Bock, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 186 days.

(21) Appl. No.: 17/494,410

(22) Filed: Oct. 5, 2021

(65) Prior Publication Data

US 2023/0108512 A1 Apr. 6, 2023

(51) Int. Cl.
*F28D 9/00* (2006.01)
(52) U.S. Cl.
CPC .................................. *F28D 9/0018* (2013.01)
(58) Field of Classification Search
CPC ............. F28D 9/0018; F28D 7/16; F28F 9/02
See application file for complete search history.

(56) References Cited

U.S. PATENT DOCUMENTS

| | | | |
|---|---|---|---|
| 4,263,260 | A | 4/1981 | Brautigam |
| 7,866,372 | B2 | 1/2011 | Slaughter |
| 9,976,815 | B1 | 5/2018 | Roper et al. |
| 10,126,071 | B2 | 11/2018 | Wortmann et al. |
| 10,955,200 | B2 | 3/2021 | Sabo et al. |
| 2008/0118310 | A1 | 5/2008 | Graham |
| 2010/0096115 | A1 | 4/2010 | Erickson |
| 2016/0305713 | A1 | 10/2016 | Grande Fernandez et al. |
| 2016/0305719 | A1 | 10/2016 | Landre |
| 2020/0191493 | A1 | 6/2020 | Schwalm |

FOREIGN PATENT DOCUMENTS

| | | |
|---|---|---|
| EP | 1906101 A1 | 4/2008 |
| EP | 2706320 A2 | 3/2014 |
| EP | 2941612 A1 | 11/2015 |

*Primary Examiner* — Jon T. Schermerhorn, Jr.
(74) *Attorney, Agent, or Firm* — Dority & Manning, P.A.

(57) ABSTRACT

A thermal structure for management of thermal energy, the thermal structure including: a first wall structure defining a first cavity; a second wall structure defining a second cavity, the second cavity in fluid communication with the first cavity; and a barrier cavity defined at least in-part by the first wall structure and the second wall structure, wherein the barrier cavity is disposed between the first cavity and the second cavity and includes a pressurized barrier fluid therein or is configured to receive the pressurized barrier fluid during operation of the thermal structure.

19 Claims, 4 Drawing Sheets

PRESSURE EQUILIBRATED THERMAL INSULATION GAP

FEDERALLY SPONSORED RESEARCH

This invention was made with government support under contract number DE-AR0001120 awarded by the Department of Energy. The U.S. government may have certain rights in the invention.

FIELD

The present disclosure relates to thermal management systems. In particular, the present disclosure relates to a configuration of cavities within a thermal energy management structure.

BACKGROUND

Thermal management systems generally include structures and/or fluids for managing the transfer of thermal energy between different components or mediums. Thermal management systems are incorporated across a wide variety of technology areas where there is a need to manage thermal energy.

In existing thermal management systems, a leakage of thermal energy can occur between working fluid(s) of a thermal structure. Such leakage of thermal energy may result in a loss in efficiency of the thermal structure and thermal management system. Accordingly, the inventors of the present disclosure have found that improvements to these thermal structures would be beneficial.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the described embodiment as it is oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any desired additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as fabrication of objects by building objects point-by-point, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 μm and 200 μm, although the thickness may be determined based on any number of parameters and may be any suitable size.

As used herein, the terms "integral", "unitary", or "monolithic" as used to describe a structure, refers to the structure being formed integrally of a continuous material or group of materials with no seams, connections joints, or the like. The integral, unitary structures described herein may be formed through additive manufacturing to have the described structure, or alternatively through a casting process, etc.

The present disclosure is generally related to thermal structures for managing thermal heat transfer. The disclosed design of a thermal structure positions a barrier cavity between supply and discharge manifolds to thermally isolate the supply and discharge manifolds from each other. The barrier cavity includes a pocket of volume that is at approximately the same pressure as the supply manifold and/or the discharge manifold. The pressure equilibrated volume in the barrier cavity acts as a thermal insulation gap in the thermal structure. The thermal isolation provides an increase in efficiency of the exchange of thermal energy between working fluids by preventing or minimizing a thermal short-circuit of the working fluid flowing from the supply manifold to the discharge manifold, and decreases a structural load by allowing for relative thermal growth between the structure defining the supply manifold and the structure defining the discharge manifold and allowing a structural load to be supported by surrounding elements.

The proposed disclosure enables thermal structure interior manifolds for high pressure, high temperature heat exchangers. The interior manifolds enable a thermal structure design that is lightweight, because the interior can maintain thin walls and still hold pressure. The disclosed design also prevents the use heavy, thick walls to contain the high-pressure fluid in the plenums and manifolds.

Figure 1:
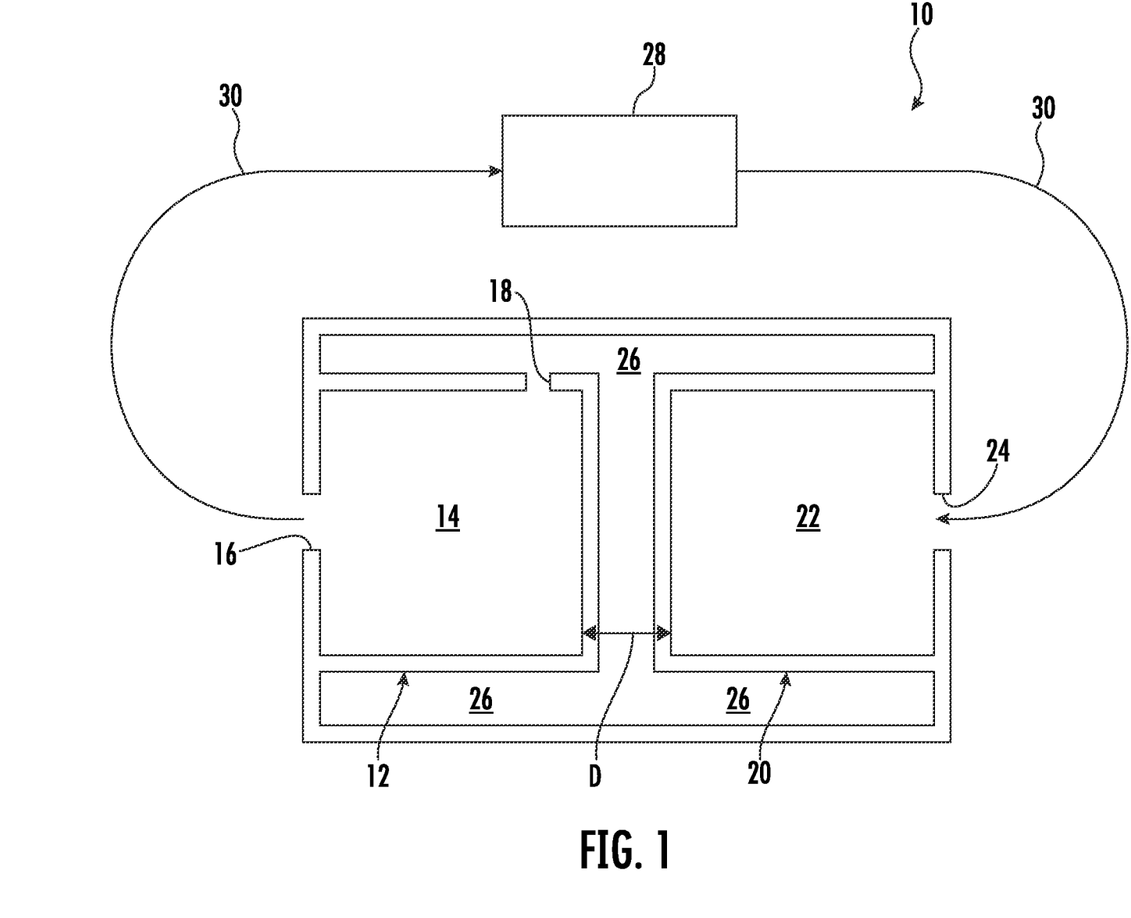
FIG. 1 is a simplified schematic view of thermal structure with a thermal insulation gap and two manifolds in accordance with an exemplary aspect of the present disclosure.

Referring now to the drawings, wherein identical numerals indicate the same elements throughout the figures, FIG. 1 is a simplified schematic view of a thermal structure 10 with a thermal insulation gap and two manifolds in accordance with an exemplary aspect of the present disclosure.

Thermal structure 10 includes a first wall structure 12 that defines a first cavity 14, an outlet 16, and an orifice 18. In certain exemplary embodiments, thermal structure 10 can be configured as a heat exchanger.

In certain exemplary embodiments, first wall structure 12 is a series of partitions or solid barriers connected together. In this exemplary embodiment, first wall structure 12 includes three wall sections and is generally configured in a rectangular shape. It will be appreciated, however, that in other exemplary embodiments, first wall structure 12 can include any number of wall sections and can be configured in another shape.

First cavity 14 is a plenum or chamber defined by and within first wall structure 12. For example, first cavity 14 can be a supply plenum or manifold.

In certain exemplary embodiments, first cavity 14 is filled with a pressurized working fluid. More specifically, in at least certain exemplary aspects, first cavity 14 is configured to receive a flow of the working fluid at a first pressure equal to or greater than 200 bar. For example, the first pressure of the pressurized working fluid in first cavity 14 may be 250 bar or greater (such as 500 bar or greater, such as 750 bar or greater, such as equal to or less than 1000 bar).

Outlet 16 and orifice 18 are openings or fluidic ports configured for the passage of a fluid. Outlet 16 is defined by an opening in first wall structure 12. Outlet 16 is fluidly connected to first cavity 14 and to working fluid flowpath 30. Orifice 18 is defined by first wall structure 12 and is fluidly connected to first cavity 14 and to barrier cavity 26. In another exemplary embodiment, orifice 18 can be defined by a valve disposed in first wall structure 12.

Thermal structure 10 also includes a second wall structure 20 that defines a second cavity 22 and an inlet 24. Second wall structure 20 is a series of partitions or solid barriers connected together. In this exemplary embodiment, second wall structure 20 includes three wall sections and is generally configured in a rectangular shape. It will be appreciated, however, that in other exemplary embodiments, second wall structure 20 can include any number of wall sections and can be configured in another shape. In certain exemplary embodiments, first wall structure 12 and second wall structure 20 are completely separated with no direct connection (e.g., no adjoining or common walls, no direct structural connection, no direct conduction/conductive connection).

Second cavity 22 is a plenum or chamber formed by and within second wall structure 20. For example, second cavity 22 can be a supply plenum or manifold.

In certain exemplary embodiments, second cavity 22 is filled with a pressurized working fluid. More specifically, in at least certain exemplary aspects, second cavity 22 is configured to receive a flow of the working fluid at a second pressure substantially equal to the first pressure, such as equal to or greater than 200 bar. For example, the second pressure can be 250 bar or greater (such as 500 bar or greater, such as 750 bar or great, such as equal to or less than 1000 bar). Second cavity 22 is in fluid communication with first cavity 14 via working fluid flowpath 30.

Both of first cavity 14 and second cavity 22 are configured to receive a flow of the working fluid. In certain exemplary embodiments, first cavity 14 and second cavity 22 are separated by distance D. As shown in FIG. 1, distance D is a distance extending between first cavity 14 and second cavity 22. More specifically, in at least certain exemplary aspects, distance D is the distance between first cavity 14 and second cavity 22 where the distance between points of first cavity 14 and second cavity 22 are at a minimum. In certain exemplary embodiments, distance D is equal to or greater than 1/8 of an inch (such as greater than 1/4 of an inch, such as less than or equal to 1/2 of an inch).

Inlet 24 is a port or opening defined by and disposed in first wall structure 12. Inlet 24 connects working fluid flowpath 30 with second cavity 22. Second cavity 22 is configured to receive the flow of the working fluid via inlet 24.

Thermal structure 10 also defines a barrier cavity 26. Barrier cavity 26 is a plenum or chamber that is configured to contain a pressurized fluid. Barrier cavity 26 is defined at least in-part by first wall structure 12 and second wall structure 20. Barrier cavity 26 is disposed between first cavity 14 and second cavity 22. Additionally, barrier cavity 26 partially surrounds first cavity 14 and second cavity 22. First wall structure 12 and second wall structure 20 are, for the embodiment shown, separated by barrier cavity 26. Barrier cavity 26 includes a pressurized barrier fluid therein or is configured to receive the pressurized barrier fluid during operation of thermal structure 10.

Barrier cavity 26 is fluidly connected to one of first cavity 14 or second cavity 22 through orifice 18. Barrier cavity 26 is, for the embodiment shown, fluidly connected to first cavity 14 through orifice 18. It will be appreciated, however, that in other exemplary embodiments, orifice 18 can be defined by second wall structure 20 such that barrier cavity 26 is fluidly connected to second cavity 22 through orifice 18. In certain exemplary embodiments, barrier cavity 26 is completely fluidly isolated except for orifice 18.

Barrier cavity 26 is fluidly connected to one of first cavity 14 or second cavity 22 to receive the working fluid as the pressurized barrier fluid such that during operation a pressure within barrier cavity 26 is substantially equal to a pressure in one of first cavity 14 or second cavity 22. In certain exemplary embodiments, the barrier fluid pressure can be substantially equal to the first pressure in first cavity 14, substantially equal to the second pressure in second cavity 22, or between the first and second pressures.

Additionally, or alternatively, barrier cavity 26 can be configured to receive a portion of the working fluid from one of first cavity 14 or second cavity 22 as a substantially static barrier fluid. For example, as mentioned above, orifice 18 may be relatively small. Such may facilitate the flow of working fluid from first cavity 14 into barrier cavity 26 and allow for a substantial equalization of a pressure in the barrier cavity with the first pressure. However, the relatively small size of orifice 18 may minimize flow between barrier cavity 26 and first cavity 14 after the pressures have equalized, to enhance the functionality of the working fluid within barrier cavity 26 acting as a thermal barrier between first and second cavities 14, 22, and not as a thermal short circuit.

It will be appreciated, however, that in other exemplary embodiments, the barrier fluid can be a different fluid than the working fluid. For example, the barrier fluid fed into barrier cavity 26 can include a fluid (e.g., gas) with a low thermal conductivity. In such a configuration, thermal structure 10 may define an orifice or opening fluidly separate from first and second cavities 14, 22 for providing the barrier fluid to barrier cavity 26.

Referring still to FIG. 1, thermal structure 10 also includes a thermal load element 28. Thermal load element 28 is a component configured for transferring thermal energy. Thermal load element 28 is in fluid communication with first cavity 14, second cavity 22, or both of first and second cavities 14 and 22. In this exemplary embodiment, thermal load element 28 is disposed at a distance from first wall structure 12, from first cavity 14, from second wall structure 20, from second cavity 22, and from barrier cavity 26. In other exemplary embodiments, thermal load element 28 can be disposed in contact with one or more components of thermal structure 10 (see, e.g., FIG. 4 and corresponding description thereof provided below).

Thermal structure 10 also defines a working fluid flowpath 30. Working fluid flowpath 30 is a flowpath of the working fluid that extends from outlet 16, to thermal load element 28, through thermal load element 28, and from thermal load element 28 to inlet 24.

Here, with the pressure of the barrier fluid inside of barrier cavity 26 being approximately the same as the first pressure of the working fluid inside first cavity 14 and/or approximately the same pressure as the pressure of the second working fluid inside of second cavity 22, a pressure differential across first wall structure 12 (to barrier cavity 26) and across second wall structure 20 (to barrier cavity 26) is minimized or eliminated resulting in equalization of pressures between first cavity 14, second cavity 22, and barrier cavity 26. With there being little to no pressure differential across first wall structure 12 and second wall structure 20, a structural load caused by the pressure differential between cavities, and that is placed on first wall structure 12 and second wall structure 20, is minimized or eliminated. In addition, the reduction or elimination in structural load within thermal structure 10 allows for a thinner and lighter design of first wall structure 12 and second wall structure 20 because there is no longer a need for heavy, thick walls typically required in thermal structures without a barrier cavity.

In the present disclosure of thermal structure 10 with barrier cavity 26, barrier cavity 26 acts as a thermal insulation gap between first cavity 14 and second cavity 22 of thermal structure 10. The thermal isolation function of barrier cavity 26 enables the transfer of thermal energy by thermal structure 10 to be significantly more efficient than thermal structures without a barrier cavity disposed between the two fluid cavities or manifolds. For example, barrier cavity 26 prevents a thermal short-circuit of the operating fluids between first cavity 14 and second cavity 22.

Additionally, the thermal isolation function of barrier cavity 26 enables thermal structure 10 to be isothermal such that thermal structure 10 can expand and contract without the components of thermal structure 10 running into anything. For example, as first wall structure 12 is separated from second wall structure 20 by barrier cavity 26, a thermal growth of first wall structure 12 relative to second wall structure 20 (resulting from, e.g., the working fluid within first cavity 14 being at a different temperature than the working fluid within second cavity 22 as a result of thermal load element 28) will create little to no additional stress on first and second wall structures 12, 20. The thermal isolation function of barrier cavity 26 also enables elimination of internal thermal gradients within thermal structure 10 thereby reducing any structural expansion/contraction between elements of thermal structure 10. Moreover, the thermal isolation function of barrier cavity 26 reduces an amount of thermal energy loss to surrounding structures which increases the overall efficiency of thermal structure 10.

Figure 2:
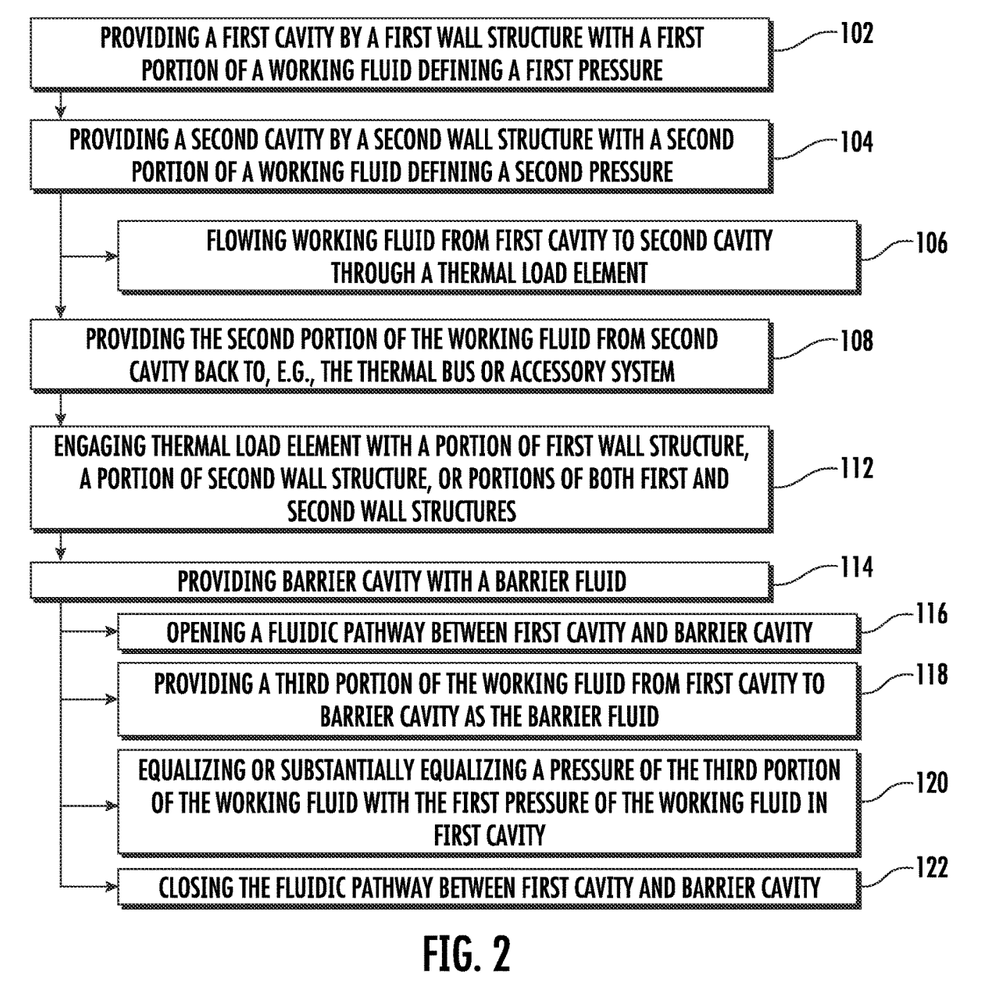
FIG. 2 is a flowchart of a method of operating a thermal structure in accordance with an exemplary aspect of the present disclosure.

Referring now to FIG. 2, FIG. 2 is a flowchart of a method 100 of operating a thermal structure (e.g., thermal structure 10) in accordance with an exemplary aspect of the present disclosure. In an exemplary embodiment, method 100 of operating thermal structure 10 includes steps 102 through 122.

Method 100 includes at 102 providing a first cavity 14 defined by a first wall structure 12 with a first portion of a working fluid defining a first pressure. Providing first cavity 14 with the first portion of the working fluid at step 102 may include providing the first portion of the working fluid to the first cavity from, e.g., a thermal bus or accessory system of, e.g., a gas turbine engine.

Method 100 further includes at 104 providing a second cavity 22 defined by a second wall structure 20 with a second portion of the working fluid defining a second pressure. Providing second cavity 22 with the second portion of the working fluid can include flowing working fluid from first cavity 14 to second cavity 22.

Moreover, for the exemplary aspect depicted, providing second cavity 22 with the second portion of the working fluid can include flowing working fluid from first cavity 14 to second cavity 22 at 104 further includes at step 106 flowing working fluid from first cavity 14 to second cavity 22 through a thermal load element, such as thermal load element 28 of FIG. 1.

Method 100 includes at 108 providing the second portion of the working fluid from second cavity 22 back to, e.g., the thermal bus or accessory system. In certain exemplary embodiments, first wall structure 12 and second wall structure 20 define barrier cavity between first wall structure 12 and second wall structure 20.

Further, for the exemplary aspect of FIG. 2, the method 100 includes at 112 engaging thermal load element 28 with a portion of first wall structure 12, a portion of second wall structure 20, or portions of both first and second wall structures 12 and 20 such that thermal load element 28 is configured to absorb a structural load in response to thermal expansion of the portion of first wall structure 12, the portion of second wall structure 20, or portions of both first and second wall structures 12 and 20.

Method 100 includes at 114 providing barrier cavity 26 with a barrier fluid. Providing barrier cavity 26 with the barrier fluid can include providing a third portion of the working fluid from first cavity 14 to barrier cavity 26. Method 100 may also include at 114 step 116 of opening a fluidic pathway between first cavity 14 and barrier cavity 26. Method 100 may also include at 114 step 118 of providing a third portion of the working fluid from first cavity 14 to barrier cavity 26 as the barrier fluid.

Method 100 may also include at 114 step 120 of equalizing or substantially equalizing a pressure of the third portion of the working fluid with the first pressure of the working fluid in first cavity 14. Method 100 may also include at 114 step 122 of closing the fluidic pathway between first cavity 14 and barrier cavity 26. For example, barrier cavity 26 can be dead-headed (e.g., fluidically sealed, hermetically sealed, etc.) once the working fluid within barrier cavity 26 reaches a desired pressure and/or volume. Although not depicted (in FIG. 1), thermal structure 10 may include a valve or similar structure to facilitate such operation.

Figure 3:
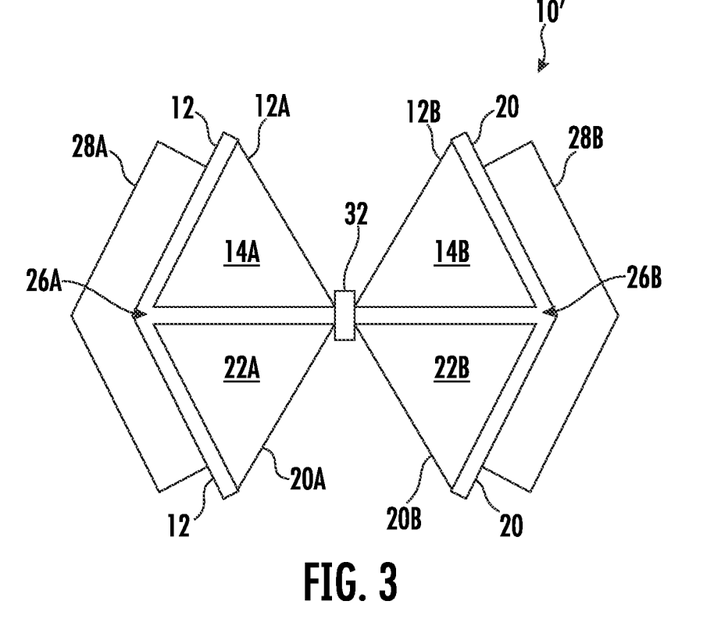
FIG. 3 is a simplified schematic view of another thermal structure with a thermal insulation gap and external thermal load elements in accordance with an exemplary aspect of the present disclosure.

Referring now to FIG. 3, FIG. 3 is a simplified schematic view of another thermal structure 10' with a thermal insulation gap and external thermal load elements in accordance with an exemplary aspect of the present disclosure. In one exemplary embodiment, the view provided in FIG. 3 can represent a top cross-section view of a tubular heat exchanger with a portion of the heat exchanger extending into the page.

The thermal structure 10' depicted includes a first wall structure 12 that defines a first cavity, a second wall structure 20 that defines a second cavity, an outlet 16 (not shown), and an orifice 18 (not shown). In certain exemplary embodiments, thermal structure 10' can be configured as a heat exchanger. In certain exemplary embodiments, thermal structure 10' (and thermal structure 10 of FIG. 1) is built by additive manufacturing.

More particularly, for the embodiment depicted, thermal structure 10' includes a first working fluid portion and a second working fluid portion. The thermal structure may be configured to transfer heat from a first working fluid through the first working fluid portion to a second working fluid through the second working fluid portion, or vice versa.

In particular, the first working fluid portion includes a first section 12A of the first wall structure 12 defining a first working fluid ("FWF") first cavity 14A and a first section 20A of the second wall structure 20 defining an FWF second cavity 22A. The first sections 12A, 20A of the first and second wall structures 12, 20 together define a first barrier cavity 26A. One of the first sections 12A, 20A of the first and second wall structures 12, 20 may define a first orifice (similar to orifice 18 of FIG. 1).

Similarly, the second working fluid portion includes a second section 12B of the first wall structure 12 defining a second working fluid ("SWF") first cavity 14B and a second section 20B of the second wall structure 20 defining a SWF second cavity 22B. The second sections 12B, 20B of the first and second wall structures 12, 20 together define a second barrier cavity 26B. One of the second sections 12B, 20B of the first and second wall structures 12, 20 may define a second orifice (similar to orifice 18 of FIG. 1).

As compared to first wall structure 12 of FIG. 1, first wall structure 12 shown in FIG. 3 defines (with the second wall structure 20) the first and second barrier cavities 26A, 26B each in a shape of an arrowhead. It will be appreciated, however, that in other exemplary embodiments, first wall structure 12 and second wall structure 20 can be configured such that a shape of first barrier cavity 26A, a shape the second barrier cavity 26B, or both can include other geometric shapes.

Moreover, in the exemplary embodiment of FIG. 3, FWF first cavity 14A, FWF second cavity 22A, SWF first cavity 14B, and SWF second cavity 22B include a triangular shape. It will be appreciated, however, that in other exemplary embodiments, first and second wall structures 12, 20 can be configured such that a shape of FWF first cavity 14A and FWF second cavity 22A can include other geometric shapes such as a parallelogram or a portion of a circle, and similarly such that a shape of SWF first cavity 14B and SWF second cavity 22B can include other geometric shapes such as a parallelogram or a portion of a circle.

In certain exemplary embodiments, FWF first cavity 14A and FWF second cavity 22A can include layered portions of unit cells configured for the passage of a thermal heat transfer working fluid or fluids. More specifically, in at least certain exemplary aspects, unit cells can be configured to pass various working fluids into and out of the page during operation of thermal structure 10'. The SWF first cavity 14B and SWF second cavity 22B may be configured in a similar manner.

As mentioned above, the FWF first cavity 14A and FWF second cavity 22A can each include a portion of a flow of the first working fluid. The FWF first cavity 14A can include a first portion of the first working fluid at a first pressure, while FWF second cavity 22A can include a second portion of the first working fluid at a second pressure that is different than the first pressure. In such an example, first barrier cavity 26A can include a first barrier fluid with a first barrier fluid pressure. During operation of thermal structure 10', the first barrier fluid pressure of the first barrier fluid can equalize with the first pressure of the first portion of the working fluid in the FWF first cavity 14A (e.g., through an orifice, not shown) such that the first barrier fluid pressure of the first barrier fluid is approximately equal to the first pressure of the first portion of the working fluid in the FWF first cavity 14A.

Likewise, the SWF first cavity 14B and SWF second cavity 22B can each include a portion of a flow of the second working fluid. The SWF first cavity 14B can include a first portion of the second working fluid at a first pressure, while SWF second cavity 22B can include a second portion of the second working fluid at a second pressure that is different than the first pressure. In such an example, second barrier cavity 26B can include a second barrier fluid with a second barrier fluid pressure. During operation of thermal structure 10', the second barrier fluid pressure of the second barrier fluid can equalize with the first pressure of the first portion of the second working fluid in the SWF first cavity 14B (e.g., through an orifice, not shown) such that the second barrier fluid pressure of the second barrier fluid is approximately equal to the first pressure of the first portion of the second working fluid in the SWF first cavity 14B.

Thermal structure 10' depicted further includes a wall 32 disposed between first barrier cavity 26A and by second barrier cavity 26B. First and second barrier cavities 26A, 26B are each defined in part by wall 32. Wall 32 is connected to both of first wall structure 12 and second wall structure 20. Wall 32 is disposed between and separates first barrier cavity 26A and second barrier cavity 26B. In this way, wall 32 prevents transmission of barrier fluid between first barrier cavity 26A and second barrier cavity 26B to thermally isolate first barrier cavity 26A from second barrier cavity 26B.

Thermal structure 10' also includes a first thermal load element 28A and a second thermal load element 28B. Similar to thermal load element 28 shown and described with respect to FIG. 1, first thermal load element 28A and second thermal load element 28B are components configured for transferring thermal energy. In certain exemplary embodiments, first thermal load element 28A and second thermal load element 28B can be configured to transfer thermal energy between the first and second working fluids, such as in the non-limiting embodiment of thermal structure 10' being configured as a heat exchanger. As will be described in further detail with respect to FIG. 4, first thermal load element 28A and second thermal load element 28B each receive the first working fluid from FWF first cavity 14A and the second working fluid from SWF first cavity 14B, and further provide the first working fluid to the FWF second cavity 22A and the second working fluid to the SWF second cavity 22B.

In certain exemplary embodiments, first thermal load element 28A and second thermal load element 28B are engaged with portions of first wall structure 12 and second wall structure 20. More specifically, in at least certain exemplary aspects, first thermal load element 28A and second thermal load element 28B are disposed adjacent to and in contact with portions of first wall structure 12 and second wall structure 20 such that first thermal load element 28A and second thermal load element 28B provide structural support to first wall structure 12 and second wall structure 20. For example, as first wall structure 12 and second wall structure 20 expand due to thermal expansion, first thermal load element 28A and second thermal load element 28B are configured to absorb a structural load in response to thermal expansion of first wall structure 12 and second wall structure 20.

Similar to the discussion provided above with respect to FIG. 1, with the pressure of the first barrier fluid inside of first barrier cavity 26A being approximately the same as the first pressure of the first working fluid inside FWF first cavity 14A, the pressure differential across the first section 12A of the first wall structure 12 is minimized or eliminated. Further, a pressure in the FWF second cavity 22A may be similar to the pressure in the FWF first cavity 14A (since the first working fluid is provided from the FWF first cavity 14A to the FWF second cavity 22A), and as such, a pressure differential across the first section 20A of the second wall structure 20 may also be minimized or eliminated.

Similarly, with the pressure of the second barrier fluid inside of second barrier cavity 26B being approximately the same as the first pressure of the second working fluid inside the SWF first cavity 14B, the pressure differential across second section 12B of the first wall structure 12 may also be minimized or eliminated. Further, a pressure in the SWF second cavity 22B may be similar to the pressure in the SWF first cavity 14B (since the second working fluid is provided from the SWF first cavity 14B to the SWF second cavity 22B), and as such, a pressure differential across the second section 20B of the second wall structure 20 may also be minimized or eliminated.

In addition, the reduction or elimination in structural load within thermal structure 10' may allow for thinner and lighter designs of first and second wall structures 12, 20 because there is no longer a need for heavy, thick walls typically required in thermal structures without a barrier cavity.

In the present disclosure of thermal structure 10' with first barrier cavity 26A, first barrier cavity 26A acts as a thermal insulation gap between FWF first cavity 14A and FWF second cavity 22A of thermal structure 10'. The thermal isolation function of first barrier cavity 26A enables the transfer of thermal energy by thermal structure 10' to be significantly more efficient than thermal structures without a barrier cavity disposed between the two fluid cavities or manifolds. For example, first barrier cavity 26A prevents a thermal short-circuit of the first working fluid between FWF first cavity 14A and FWF second cavity 22A.

Likewise, second barrier cavity 26B acts as a thermal insulation gap between SWF first cavity 14B and SWF second cavity 22B of thermal structure 10'. The thermal isolation function of second barrier cavity 26B enables the transfer of thermal energy by thermal structure 10' to be significantly more efficient than thermal structures without a barrier cavity disposed between the two fluid cavities or manifolds. For example, second barrier cavity 26B prevents a thermal short-circuit of the second working fluid between SWF first cavity 14B and SWF second cavity 22B of second cavity 22.

Additionally, the thermal isolation function of first barrier cavity 26A and second barrier cavity 26B enables thermal structure 10' to be isothermal such that thermal structure 10' can expand and contract without the components of thermal structure 10' running into anything. The thermal isolation function of first barrier cavity 26A and second barrier cavity 26B also enables elimination of internal thermal gradients within thermal structure 10' thereby reducing any structural expansion/contraction between elements of thermal structure 10'. Moreover, the thermal isolation function of first barrier cavity 26A and second barrier cavity 26B reduces an amount of thermal energy loss to surrounding structures which increases the overall efficiency of thermal structure 10'.

Figure 4:
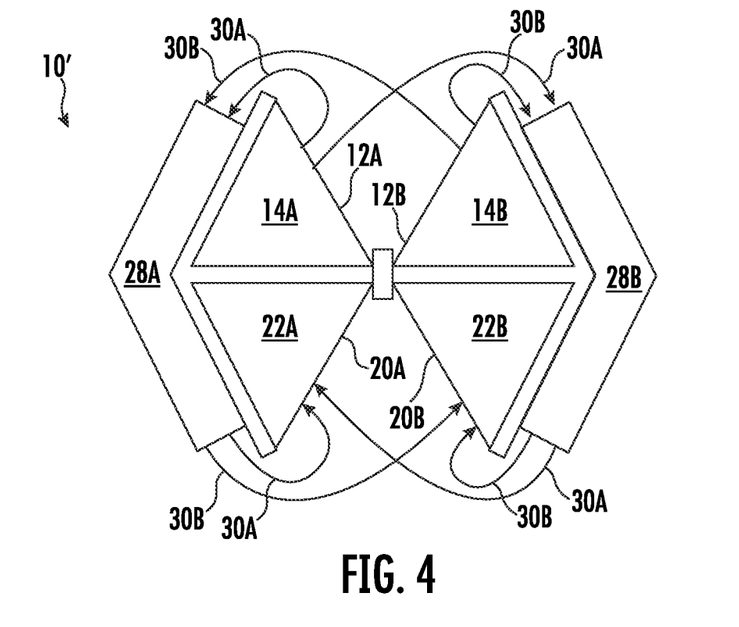
FIG. 4 is a simplified schematic view of another thermal structure with the thermal insulation gap and shows various flows of working fluids in accordance with an exemplary aspect of the present disclosure.

Referring now to FIG. 4, FIG. 4 is another simplified schematic view of thermal structure 10' and shows various flows of working fluids in accordance with an exemplary aspect of the present disclosure. The embodiment provided in FIG. 4 may be configured in substantially the same manner as described in regard to FIG. 3, with the addition of a first working fluid ("FWF") flowpath 30A and a second working fluid ("SWF") flowpath 30B.

In this exemplary embodiment, two thermal load elements are provided. It will be appreciated, however, that in other exemplary embodiments, less or more than two thermal load elements can be disposed as part of thermal structures 10 and 10' (such as four thermal load elements, such as eight thermal load elements, such as 10 thermal load elements).

Similar to working fluid flowpath 30 described with respect to FIG. 1, FWF flowpath 30A and SWF flowpath 30B are flowpaths of a working fluid of thermal structure 10', and more particularly are flowpaths of the first working fluid and the second working fluid, respectively.

In this exemplary embodiment, a first section of FWF flowpath 30A passes from FWF first cavity 14A to first thermal load element 28A, through first thermal load element 28A, then from first thermal load element 28A to FWF second cavity 22A. Additionally, a second section of FWF flowpath 30A passes from FWF first cavity 14A to second thermal load element 28B, through second thermal load element 28B, then from second thermal load element 28B to FWF second cavity 22A.

Similarly, a first portion of SWF flowpath 30B passes from SWF first cavity 14B to first thermal load element 28A, through first thermal load element 28A, then from first thermal load element 28A to SWF second cavity 22B. Further, a second portion of SWF flowpath 30B passes from SWF first cavity 14B to second thermal load element 28B, through second thermal load element 28B, then from second thermal load element 28B to SWF second cavity 22B.

In such a manner, it will be appreciated that first and second portions of FWF flowpath 30A and SWF flowpath 30B flow in parallel through first and second thermal load elements 28A, 28B. Further, in such a manner, it will be appreciated that with such a configuration, the first working fluid may transfer heat with the second working fluid. For example, in one embodiment the first working fluid may start off in the FWF first cavity 14A with a relatively high amount of thermal energy and the second working fluid may start off in the SWF first cavity 14B with a relatively low amount of thermal energy. Within first and second thermal load elements 28A, 28B, thermal energy may be transferred from the first working fluid to the second working fluid. As such, the first working fluid within the FWF second cavity 22A may have less thermal energy than the first working fluid within the FWF first cavity 14A, and the second working fluid within the SWF second cavity 22B may have more thermal energy than the second working fluid within the SWF first cavity 14B. Use of the first and second barrier cavities 26A, 26B may prevent or minimize thermal energy transferring from FWF first cavity 14A to FWF second cavity 22A, and similarly from SWF second cavity 22B to SWF first cavity 14B.

Moreover, it will be appreciated that by having separate first and second barrier cavities 26A, 26B, the first and second barrier cavities 26A, 26B may be at different pressures to accommodate first and second working fluids also being at different pressures. For example, the first barrier cavity 26A may be fed by FWF first cavity 14A or FWF second cavity 22A, such that the pressure within the first barrier cavity 26A is substantially equal to a pressure of the first working fluid in the FWF first cavity 14A or FWF second cavity 22A. Similarly, the second barrier cavity 26B may be fed by SWF first cavity 14B or SWF second cavity 22B, such that the pressure within the second barrier cavity 26B is substantially equal to a pressure of the second working fluid in the SWF first cavity 14B or SWF second cavity 22B. In such a manner, the first and second working fluids may be at substantially different pressures, without affecting the ability of both the first and second barrier cavities 26A, 26B from relieving the strain on the first sections 12A, 20A of first and second wall structures 12, 20 to contain the first working fluid and on the second sections 12B, 20B of the first and second wall structures 12, 20 to contain the second working fluid.

Figure 5:
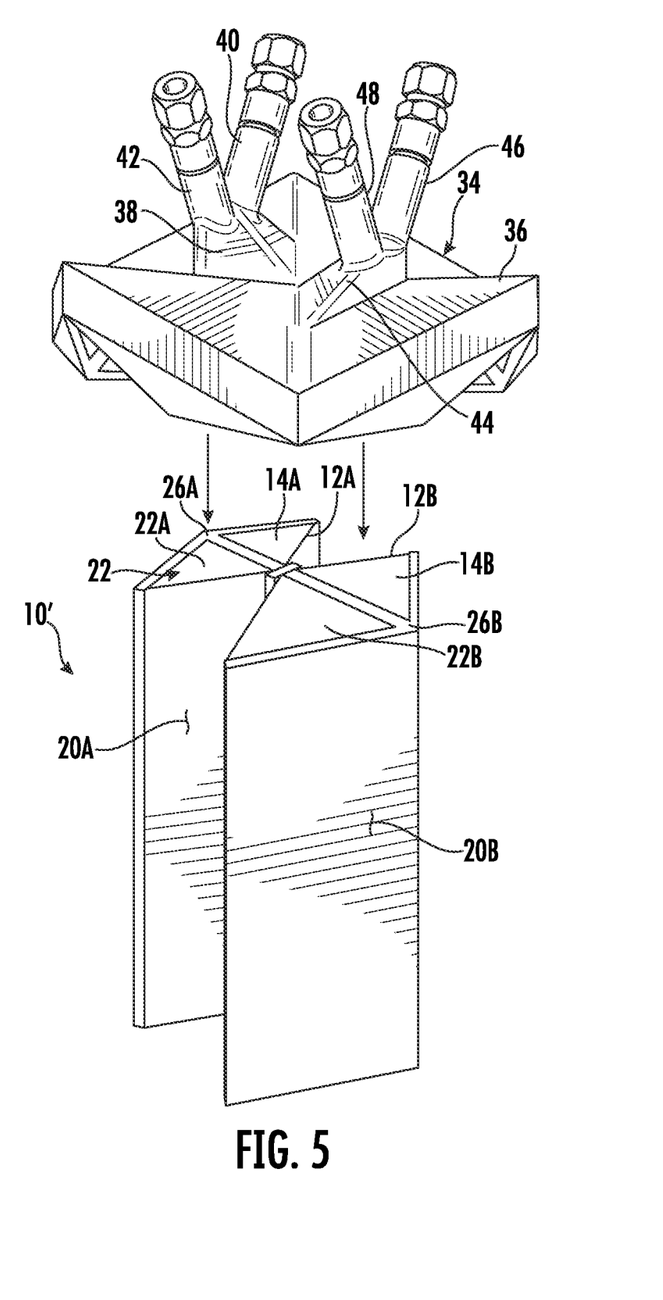
FIG. 5 is a perspective exploded view of a thermal structure and an endcap in accordance with an exemplary aspect of the present disclosure.

Referring now to FIG. 5, FIG. 5 is a perspective exploded view of thermal structure 10' and an endcap 34 in accordance with an exemplary aspect of the present disclosure. The embodiment provided in FIG. 5 of thermal structure 10' may be configured in substantially the same manner as described in regard to FIGS. 3 and 4.

In addition to thermal structure 10', FIG. 5 also shows the endcap 34. Endcap 34 is a lid or cover configured to contain a fluid. In this exemplary embodiment, endcap 34 fits onto and engages with an end of thermal structure 10'. In this way, endcap 34 contains and directs a working fluid of thermal structure 10'.

Endcap 34 includes a base 36. Base 36 is a generally planar foundation of bottom of endcap 34. When assembled, base 36 of endcap comes into contact with first wall structure 12 and second wall structure 20 of thermal structure 10'. In certain exemplary embodiments, base 36 may include features for mechanically engaging with thermal structure 10', such as flanges, lips, threading, or other mechanical attachment features. Likewise, thermal structure 10' may include corresponding features for mechanically engaging with endcap 34, such as receptacles configured to receive and engage with the mechanical engagement features of endcap 34.

Endcap 34 also includes a first plenum 38. First plenum 38 is a chamber defined by base 36. First plenum 38 is configured to contain a volume of a working fluid, and in particular a volume of the first working fluid. In certain exemplary embodiments, first plenum 38 is in fluid communication with FWF first cavity 14A and FWF second cavity 22A (e.g., when endcap 34 is assembled with thermal structure 10').

More specifically, for the embodiment of FIG. 5, although not depicted, it will be appreciated that first plenum 38 is bisected by a dividing wall such that a first portion (e.g., a first half) of first plenum 38 is fluidly isolated from a second portion (e.g., a second half) of first plenum 38 and such that the first portion of first plenum 38 is in direct fluid communication with FWF first cavity 14A and such that the second portion of first plenum 38 is in direct fluid communication with FWF second cavity 22A. In such an exemplary embodiment, the dividing wall bisecting first plenum 38 may also provide a fluidic barrier across which a flow of the first working fluid from FWF first cavity 14A to FWF second cavity 22A is prevented.

Endcap 34 further includes a first inlet tube 40 and a first outlet tube 42. First inlet tube 40 and first outlet tube 42 are hollow cylinders or tubular manifolds configured for the transport of a fluid, such as the first working fluid. In this example, first inlet tube 40 and first outlet tube 42 are integrally formed with base 36 and are fluidly connected to first plenum 38. In certain exemplary embodiments, first inlet tube 40 and first outlet tube 42 can be a conduit for transporting the first working fluid from an accessory system to thermal structure 10' and then back to the accessory system.

Endcap 34 additionally includes a second plenum 44. Second plenum 44 is defined by base 36. Second plenum 44 is configured to contain a volume of a working fluid, and in particular a volume of the second working fluid. In certain exemplary embodiments, second plenum 44 is in fluid communication with SWF first cavity 14B and SWF second cavity 22B (e.g., when endcap 34 is assembled with thermal structure 10').

More specifically, for the embodiment of FIG. 5, although not depicted, it will be appreciated that second plenum 44 is bisected by a dividing wall such that a first portion (e.g., a first half) of second plenum 44 is fluidly isolated from a second portion (e.g., a second half) of second plenum 44 and such that the first portion of second plenum 44 is in direct fluid communication with SWF first cavity 14B and such that the second portion of second plenum 44 is in direct fluid communication with SWF second cavity 22B. In such an exemplary embodiment, the dividing wall bisecting second plenum 44 may also provide a fluidic barrier across which a flow of the second working fluid from SWF first cavity 14B to SWF second cavity 22B is prevented.

Endcap 34 further includes a second inlet tube 46 and a second outlet tube 48. Second inlet tube 46 and second outlet tube 48 are hollow cylinders or tubular manifolds configured for the transport of a fluid. Second inlet tube 46 and second outlet tube 48 are, for the embodiment shown, integrally formed with base 36 and are fluidly connected to second plenum 44. In certain exemplary embodiments, second inlet tube 46 and second outlet tube 48 can be a conduit for transporting the second working fluid from, e.g., an accessory system to thermal structure 10 and from thermal structure 10 back to the accessory system.

In certain exemplary embodiments, any one or more of base 36, first inlet tube 40, first outlet tube 42, second inlet tube 46, and second outlet tube 48 may include a valve. More specifically, in at least certain exemplary aspects, such a valve may include a pressure regulated check valve or a type of actively controlled variable valve.

It will be appreciated that in one or more exemplary embodiments, a thermal structure of the present disclosure, an endcap of the present disclosure, or both may be incorporated into or used with any suitable structure, such as a gas turbine engine. For example, with such a configuration, the first working fluid may be a heating fluid and the second working fluid may be a cooling fluid. For example, the first working fluid may be a lubrication oil fluid, a thermal bus fluid, a cooled cooling air, or the like. Similarly, with such a configuration, the second working fluid may be a fuel, a thermal bus fluid, a compressor bleed, a bypass airflow, or the like. Of course, in other embodiments, other suitable working fluids may be used.

Further, it will be appreciated that although in each of the exemplary embodiments depicted and described above the barrier cavities are described as receiving a working fluid from a first cavity or a second cavity as a barrier fluid, in other exemplary embodiments, the barrier cavity may be fluidly coupled to a fluid source independent of the first and second cavities. The fluid source may be a pressurized fluid source for providing a barrier fluid at a pressure substantially equal to a pressure of the working fluid. Additionally, or alternatively, the thermal structure may be manufactured with a pressurized barrier fluid already positioned therein.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A thermal structure for management of thermal energy, the thermal structure comprising: a first wall structure defining a first cavity; a second wall structure defining a second cavity, the second cavity in fluid communication with the first cavity; and a barrier cavity defined at least in-part by the first wall structure and the second wall structure, wherein the barrier cavity is disposed between the first cavity and the second cavity and comprises a pressurized barrier fluid therein or is configured to receive the pressurized barrier fluid during operation of the thermal structure.

The thermal structure of one or more of these clauses, wherein the barrier cavity is fluidly connected to one of the first cavity or the second cavity to receive the pressurized barrier fluid such that during operation a pressure within the barrier cavity is substantially equal to a pressure in one of the first cavity or the second cavity.

The thermal structure of one or more of these clauses, wherein the barrier cavity is fluidly connected to one of the first cavity or the second cavity and fluidly isolated from the other of the first cavity or the second cavity.

The thermal structure of one or more of these clauses, wherein the first wall structure and the second wall structure are separated by the barrier cavity.

The thermal structure of one or more of these clauses, wherein the thermal structure is configured as a heat exchanger, wherein the thermal structure further comprises a thermal load element in fluid communication with the first cavity, the second cavity, or both of the first and second cavities.

The thermal structure of one or more of these clauses, wherein the thermal load element is disposed adjacent to and in contact with a wall of the first wall structure, a wall of the second wall structure, or walls of both the first wall structure and the second wall structure.

The thermal structure of one or more of these clauses, wherein the thermal load element is engaged with a portion of the first wall structure, a portion of the second wall structure, or portions of both the first and second wall structures such that the thermal load element is configured to absorb a structural load in response to thermal expansion of the portion of the first wall structure, the portion of the second wall structure, or portions of both the first and second wall structures.

The thermal structure of one or more of these clauses, further comprising a thermal load element engaged with a portion of the first wall structure, a portion of the second wall structure, or portions of both the first and second wall structures such that the thermal load element is configured to absorb a structural load in response to thermal expansion of the portion of the first wall structure, the portion of the second wall structure, or portions of both the series of first and second walls.

The thermal structure of one or more of these clauses, wherein the barrier cavity is fluidly connected to one of the first cavity or the second cavity through an orifice.

The thermal structure of one or more of these clauses, wherein the barrier cavity is fluidly connected to one of the first cavity or the second cavity through an orifice, and wherein the barrier cavity is completely fluidly isolated except for the orifice.

The thermal structure of one or more of these clauses, wherein the first cavity and the second cavity are separated by a distance, wherein the distance is greater than ⅛ of an inch.

The thermal structure of one or more of these clauses, wherein the first cavity and the second cavity are configured to receive a flow of a working fluid therethrough, wherein the barrier cavity is configured to receive a portion of the working fluid from one of the first cavity or the second cavity as a substantially static barrier fluid.

The thermal structure of one or more of these clauses, wherein the first cavity is configured to receive a flow of working fluid at a first pressure equal to or greater than 200 bar.

A method of operating a thermal structure, the method comprising: providing a first cavity defined by a first wall structure with a first portion of a working fluid, wherein the first portion of the working fluid defines a first pressure; providing a second cavity defined by a second wall structure with a second portion of the working fluid, wherein the second portion of the working fluid defines a second pressure, and wherein the first and second wall structures define a barrier cavity therebetween; and providing the barrier cavity with a barrier fluid, wherein the barrier fluid defines a barrier fluid pressure, wherein the barrier fluid pressure is substantially equal to the first pressure, substantially equal to the second pressure, or between the first and second pressures.

The method of one or more of these clauses, wherein providing the barrier cavity with the barrier fluid comprises providing a third portion of the working fluid from the first cavity to the barrier cavity.

The method of one or more of these clauses, wherein providing the second cavity with the second portion of the working fluid comprises flowing working fluid from the first cavity to the second cavity.

The method of one or more of these clauses, wherein flowing working fluid from the first cavity to the second cavity comprises flowing working fluid from the first cavity to the second cavity through a thermal load element.

The method of one or more of these clauses, wherein providing the barrier cavity with the barrier fluid comprises: opening a fluidic pathway between the first cavity and the barrier cavity; providing a third portion of the working fluid from the first cavity to the barrier cavity as the barrier fluid; equalizing a pressure of the third portion of the working fluid with the first pressure of the working fluid in the first cavity; and closing the fluidic pathway between the first cavity and the barrier cavity.

The method of one or more of these clauses, wherein the barrier cavity comprises a plurality of barrier cavities, the method further comprising pressuring the plurality of barrier cavities, wherein each cavity of the plurality of barrier cavities is pressurized separately from the other barrier cavities of the plurality of the barrier cavities.

The method of one or more of these clauses, further comprising engaging a thermal load element with a portion of the first wall structure, a portion of the second wall structure, or portions of both the first and second wall structures such that the thermal load element is configured to absorb a structural load in response to thermal expansion of the portion of the first wall structure, the portion of the second wall structure, or portions of both the first and second wall structures.

We claim:

1. A thermal structure for management of thermal energy, the thermal structure comprising:
   a first wall structure defining a first cavity;
   a second wall structure defining a second cavity, the second cavity in fluid communication with the first cavity; and
   a barrier cavity defined at least in-part by the first wall structure and the second wall structure, wherein the barrier cavity is disposed between the first cavity and the second cavity and comprises a pressurized barrier fluid therein or is configured to receive the pressurized barrier fluid during operation of the thermal structure;
   wherein the first cavity and the second cavity are configured to receive a flow of a working fluid therethrough, wherein the barrier cavity is configured to receive a portion of the working fluid from one of the first cavity or the second cavity as a substantially static barrier fluid.

2. The thermal structure of claim 1, wherein the barrier cavity is fluidly connected to one of the first cavity or the second cavity to receive the pressurized barrier fluid such that during operation a pressure within the barrier cavity is substantially equal to a pressure in one of the first cavity or the second cavity.

3. The thermal structure of claim 1, wherein the barrier cavity is fluidly connected to one of the first cavity or the second cavity and fluidly isolated from the other of the first cavity or the second cavity.

4. The thermal structure of claim 1, wherein the first wall structure and the second wall structure are separated by the barrier cavity.

5. The thermal structure of claim 1, wherein the thermal structure is configured as a heat exchanger, wherein the thermal structure further comprises a thermal load element in fluid communication with the first cavity, the second cavity, or both of the first and second cavities.

6. The thermal structure of claim 5, wherein the thermal load element is disposed adjacent to and in contact with a wall of the first wall structure, a wall of the second wall structure, or walls of both the first wall structure and the second wall structure.

7. The thermal structure of claim 6, wherein the thermal load element is engaged with a portion of the first wall structure, a portion of the second wall structure, or portions of both the first and second wall structures such that the thermal load element absorbs a structural load in response to thermal expansion of the portion of the first wall structure, the portion of the second wall structure, or portions of both the first and second wall structures.

8. The thermal structure of claim 1, further comprising a thermal load element engaged with a portion of the first wall structure, a portion of the second wall structure, or portions of both the first and second wall structures such that the thermal load element absorbs a structural load in response to thermal expansion of the portion of the first wall structure, the portion of the second wall structure, or portions of both the series of first and second walls.

9. The thermal structure of claim 1, wherein the barrier cavity is fluidly connected to one of the first cavity or the second cavity through an orifice.

10. The thermal structure of claim 1, wherein the barrier cavity is fluidly connected to one of the first cavity or the second cavity through an orifice, and wherein the barrier cavity is completely fluidly isolated except for the orifice.

11. The thermal structure of claim 1, wherein the first cavity and the second cavity are separated by a distance, wherein the distance is greater than 1/8 of an inch.

12. The thermal structure of claim 1, wherein the first cavity is configured to receive a flow of working fluid at a first pressure equal to or greater than 200 bar.

13. A method of operating a thermal structure according to claim 1, the method comprising:
   providing the first cavity with a first portion of the working fluid, wherein the first portion of the working fluid defines a first pressure;
   providing the second cavity with a second portion of the working fluid, wherein the second portion of the working fluid defines a second pressure; and
   providing the barrier cavity with the pressurized barrier fluid, wherein the pressurized barrier fluid defines a barrier fluid pressure, wherein the pressurized barrier fluid pressure is substantially equal to the first pressure, substantially equal to the second pressure, or between the first and second pressures.

14. The method of claim 13, wherein providing the barrier cavity with the pressurized barrier fluid comprises providing a third portion of the working fluid from the first cavity to the barrier cavity.

15. The method of claim 13, wherein providing the second cavity with the second portion of the working fluid comprises flowing working fluid from the first cavity to the second cavity.

16. The method of claim 15, wherein flowing working fluid from the first cavity to the second cavity comprises flowing working fluid from the first cavity to the second cavity through a thermal load element.

17. The method of claim 13, wherein providing the barrier cavity with the pressurized barrier fluid comprises:
   opening a fluidic pathway between the first cavity and the barrier cavity;
   providing a third portion of the working fluid from the first cavity to the barrier cavity as the pressurized barrier fluid;
   equalizing a pressure of the third portion of the working fluid with the first pressure of the working fluid in the first cavity; and
   closing the fluidic pathway between the first cavity and the barrier cavity.

18. The method of claim 13, wherein the barrier cavity comprises a plurality of barrier cavities, the method further comprising pressuring the plurality of barrier cavities, wherein each cavity of the plurality of barrier cavities is pressurized separately from the other barrier cavities of the plurality of the barrier cavities.

19. The method of claim 18, further comprising engaging a thermal load element with a portion of the first wall structure, a portion of the second wall structure, or portions of both the first and second wall structures such that the thermal load element absorbs a structural load in response to thermal expansion of the portion of the first wall structure, the portion of the second wall structure, or portions of both the first and second wall structures.

* * * * *